US011394725B1

(12) United States Patent
Cho et al.

(10) Patent No.: US 11,394,725 B1
(45) Date of Patent: Jul. 19, 2022

(54) METHOD AND SYSTEM FOR PRIVACY-PRESERVING TARGETED SUBSTRUCTURE DISCOVERY ON MULTIPLEX NETWORKS

(71) Applicant: HRL Laboratories, LLC, Malibu, CA (US)

(72) Inventors: Chongwon Cho, Los Angeles, CA (US); Tsai-Ching Lu, Thousand Oaks, CA (US); Hyun (Tiffany) J. Kim, Irvine, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 309 days.

(21) Appl. No.: 15/923,983

(22) Filed: Mar. 16, 2018

Related U.S. Application Data

(60) Provisional application No. 62/500,862, filed on May 3, 2017.

(51) Int. Cl.
*H04L 9/40* (2022.01)

(52) U.S. Cl.
CPC .............. *H04L 63/14* (2013.01); *H04L 63/10* (2013.01)

(58) Field of Classification Search
CPC ...... G06F 21/50; G06F 16/35; G06F 16/9024; G06F 21/566; G06N 3/0445; H04L 63/1416; H04L 63/1425; H04L 63/1441; H04L 63/20; H04L 63/14; H04L 63/10
See application file for complete search history.

(56) References Cited

U.S. PATENT DOCUMENTS

| | | | |
|---|---|---|---|
| 9,692,768 B1* | 6/2017 | Kayyoor | G06F 21/6245 |
| 9,798,882 B2* | 10/2017 | Diehl | H04L 41/12 |
| 10,015,182 B1* | 7/2018 | Shintre | H04L 63/10 |
| 10,015,192 B1* | 7/2018 | Stiborek | H04L 63/145 |
| 10,178,120 B1* | 1/2019 | Keegan | H04L 63/1433 |
| 10,216,806 B1* | 2/2019 | Kenthapadi | G06F 16/9024 |
| 10,425,435 B1* | 9/2019 | Kayyoor | H04L 63/104 |
| 2005/0216956 A1* | 9/2005 | Orr | H04L 63/145 726/23 |
| 2007/0226248 A1* | 9/2007 | Darr | G06Q 10/10 |
| 2011/0208681 A1* | 8/2011 | Kuecuekyan | G06N 20/00 706/21 |

(Continued)

OTHER PUBLICATIONS

Michael Kearns, Aaron Roth, Zhiwei S. Wu, and Grigory Yaroslavtsev, Private algorithms for the protected in social network search, In Proceedings of the National Academy of Sciences, vol. 113, No. 4, pp. 913-918, 2016. (Year: 2016) (Year: 2016) (Year: 2016).*

(Continued)

*Primary Examiner* — Trang T Doan
(74) *Attorney, Agent, or Firm* — Tope-McKay & Associates

(57) ABSTRACT

Described is a system for network threat detection. The system identifies a targeted sub-network representing a threat within a multi-layer network having members. The targeted sub-network is identified with differential privacy protection, such that privacy of individuals that are not in the targeted sub-network is protected. The system causes an action to be generated, the action being one of generating an alert of a threat, initiating monitoring of the non-benign persons, or disabling network access of the non-benign persons.

12 Claims, 7 Drawing Sheets

(56) References Cited

U.S. PATENT DOCUMENTS

| | | | | |
|---|---|---|---|---|
| 2011/0246483 | A1* | 10/2011 | Darr | G06Q 10/10 |
| | | | | 707/748 |
| 2012/0137367 | A1* | 5/2012 | Dupont | G06F 21/00 |
| | | | | 726/25 |
| 2014/0245443 | A1* | 8/2014 | Chakraborty | H04L 63/1425 |
| | | | | 726/23 |
| 2015/0229662 | A1* | 8/2015 | Hitt | H04L 63/1433 |
| | | | | 726/23 |
| 2016/0028758 | A1* | 1/2016 | Ellis | H04L 63/1433 |
| | | | | 726/25 |
| 2016/0071035 | A1* | 3/2016 | Chee | G06Q 10/0635 |
| | | | | 705/7.28 |
| 2016/0156652 | A1* | 6/2016 | Paffenroth | H04L 63/1425 |
| | | | | 726/23 |
| 2016/0164905 | A1* | 6/2016 | Pinney Wood | G06F 21/577 |
| | | | | 726/25 |
| 2018/0048668 | A1* | 2/2018 | Gupta | H04L 63/1425 |
| 2018/0103052 | A1* | 4/2018 | Choudhury | H04L 63/1416 |
| 2018/0219888 | A1* | 8/2018 | Apostolopoulos | |
| | | | | H04L 63/1425 |
| 2019/0089720 | A1* | 3/2019 | Aditham | G06F 16/9014 |

OTHER PUBLICATIONS

Michael Kearns, Aaron Roth ,Zhiwei S. Wu, and Grigory Yaroslavtsev, Private algorithms for the protected in social network search, InProceedingsoftheNationalAcademyofSciences,vol. 113,No. 4,pp. 913-918,2016. (Year: 2016).*

Michael Kearns, Aaron Roth ,Zhiwei S. Wu, and Grigory Yaroslavtsev, Private algorithms for the protected in social network search, InProceedingsofthe NationalAcademyofSciences, vol. 113,No. 4,pp. 913-918,2016. (Year: 2016) (Year: 2016).*

Avrim Blum, Cynthia Dwork, Frank McSherry, and Kobbi Nissim. Practical privacy: The SuLQ framework. In Proceedings of the 24th ACM SIGMOD-SIGACT-SIGART Symposium on Principles of Database Systems, pp. 128-138, Jun. 2005.

Irit Dinurand Kobbi Nissim. Revealing information while preserving privacy. In Proceedings of the 22nd ACM SIGMOD-SIGACT-SIGART Symposium on Principles of Database Systems, pp. 202-210, 2003.

Cynthia Dwork and Kobbi Nissim. Privacy-preserving datamining on vertically partitioned databases. In Advances in Cryptology: Proceedings of Crypto, pp. 528-544, 2004.

Cynthia Dwork and Aaron Roth, The algorithmic foundations of differential privacy. Foundations and Trends in Theoretical Computer Science, 9(3-4), pp. 211-407, 2014.

Michael Kearns, Aaron Roth, Zhiwei S. Wu, and Grigory Yaroslavtsev, Private algorithms for the protected in social network search, In Proceedings of the National Academy of Sciences, vol. 113, No. 4, pp. 913-918, 2016.

Cynthia Dwork. Differential Privacy. ICALP'06 Proceedings of the 33rd International Conference on Automata, Languages and Programming—vol. Part II, pp. 1-12, 2006.

* cited by examiner

METHOD AND SYSTEM FOR PRIVACY-PRESERVING TARGETED SUBSTRUCTURE DISCOVERY ON MULTIPLEX NETWORKS

CROSS-REFERENCE TO RELATED APPLICATIONS

This is a Non-Provisional Application of U.S. Provisional Application No. 62/500,862, filed in the United States on May 3, 2017, entitled, "Method and System for Privacy-Preserving Targeted Substructure Discovery on Multiplex Networks," the entirety of which is incorporated herein by reference.

BACKGROUND OF INVENTION

(1) Field of Invention

The present invention relates to a system for network threat detection and, more particularly, to a system for network threat detection using fused information from multiple networks.

(2) Description of Related Art

An intrusion detection system (IDS) is a device or software application that monitors a network or systems for malicious activity or policy violations. For example, Kearns et. al. (see Literature Reference No. 5 in the List of Incorporated Literature References) described a system that supports searching for a target substructure in a single network (i.e., single layer graph) with differential privacy. However, there are no existing systems for fusing information from multiple networks for intrustion/threat detection.

Thus, a continuing need exists for a system that incorporated heterogeneous information into the search of targeted sub-networks, resulting in increased detection accuracy.

SUMMARY OF INVENTION

The present invention relates to a system for network threat detection and, more particularly, to a system for network threat detection using fused information from multiple networks. The system comprises one or more processors and a memory having instructions such that when the instructions are executed, the one or more processors perform multiple operations. The system identifies a targeted sub-network representing a threat within a multi-layer network comprising a plurality of members, wherein the targeted sub-network is identified with differential privacy protection, such that privacy of individuals that are not in the targeted sub-network is protected. The system causes an action be be generated, wherein the action comprises one of generating an alert of a threat, initiating monitoring of the non-benign persons, or disabling network access of the non-benign persons.

In another aspect, the targeted sub-network is identified using a tuple of algorithms designated as $M_1$, $M_2$, $M_3$, wherein $M_1$ transforms a multi-layer network expressed as a set of graphs into a single multi-graph, $M_2$ discovers a connected subcomponent S of the single multi-graph, and $M_3$ discovers a new source vertex in the single multi-graph.

In another aspect, the system investigates a set of vertices to determine if an individual corresponding to a vertex is in the targeted sub-network and outputs a set of individuals of the targeted sub-network.

In another aspect, the system determines a proximity function $f$ which measures the largest difference between $f(G, t, S)$ and $f(G', t, S)$ for all neighboring graphs G and G' according to the following:

$$\Delta(f) = \max_{G \sim G', t \in T, S \subseteq T} |f(G, t, S) - f(G', t, S)|,$$

where G' is a neighboring graph with respect to graph G, t represents a targeted individual, T represents a targeted subgraph of G, and max represents a maximization function.

In another aspect, the multi-layer network comprises a plurality of fused layers of network information representing social proximities among nodes of the multi-layer network.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
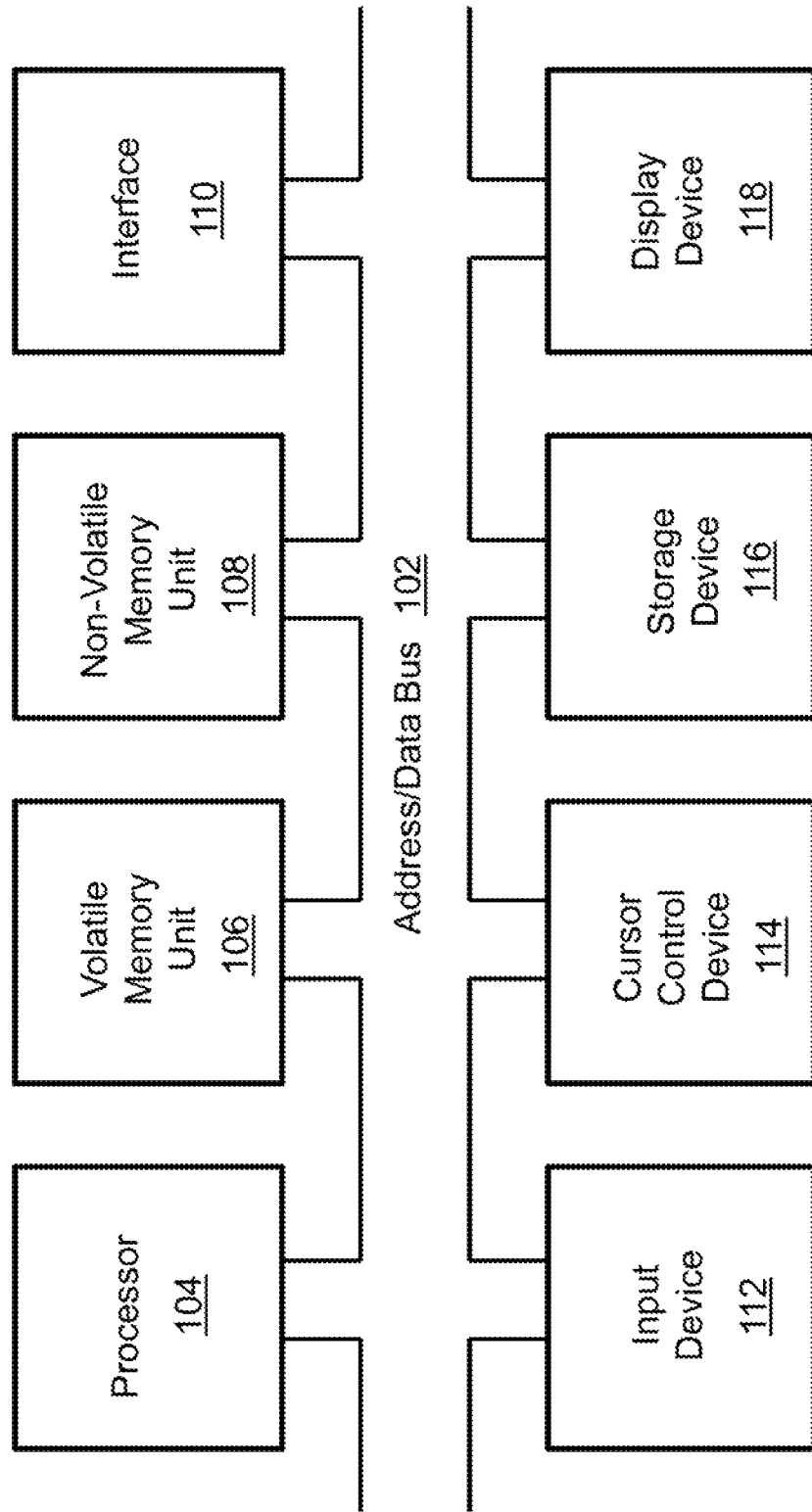
FIG. 1 is a block diagram depicting the components of a system for network threat detection according to some embodiments of the present disclosure.

The present invention relates to a system for network threat detection and, more particularly, to a system for network threat detection using fused information from multiple networks. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:
1. Avrim Blum, Cynthia Dwork, Frank McSherry, and Kobbi Nissim. Practical privacy: The SuLQ framework. In Proceedings of the 24th ACM SIGMOD-SIGACT-SIGART Symposium on Principles of Database Systems, pages 128-138, June 2005.
2. Irit Dinur and Kobbi Nissim. Revealing information while preserving privacy. In Proceedings of the 22nd ACM SIGMOD-SIGACT-SIGART Symposium on Principles of Database Systems, pages 202-210, 2003.
3. Cynthia Dwork and Kobbi Nissim. Privacy-preserving datamining on vertically partitioned databases. In Advances in Cryptology: Proceedings of Crypto, pages 528-544, 2004.
4. Cynthia Dwork and Aaron Roth, The algorithmic foundations of differential privacy. Foundations and Trends in Theoretical Computer Science, 9(3-4), pages 211-407, 2014.
5. Michael Kearns, Aaron Roth, Zhiwei S. Wu, and Grigory Yaroslavtsev, Private algorithms for the protected in social network search, In Proceedings of the National Academy of Sciences, Vol. 113, No. 4., pages 913-918, 2016.
6. Cynthia Dwork. Differential Privacy. ICALP'06 Proceedings of the 33rd International Conference on Automata, Languages and Programming—Volume Part II, pages 1-12, 2006.

(2) PRINCIPAL ASPECTS

Various embodiments of the invention include three "principal" aspects. The first is a system for network threat detection. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
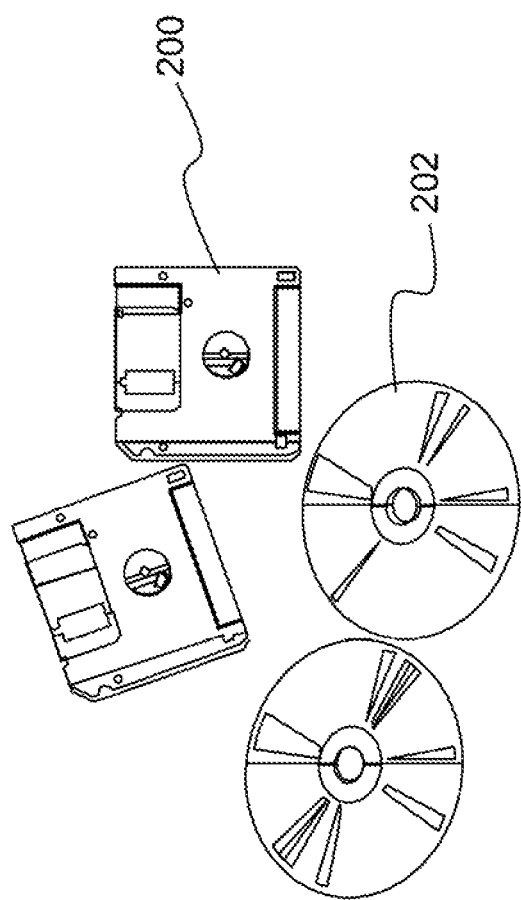
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS OF THE INVENTION

Described is a method that supports searching for targets with differential privacy protection. While an existing algorithm proposed by Kearns et al. (see Literature Reference No. 5) supports searching for a target substructure in a single network with differential privacy, the method according to embodiments of the present disclosure supports searching for a target in complex, multi-layer networks with differential privacy to increase the accuracy of the search result. A multi-layer network is a layer of multiple networks such that all networks share the same entities but have distinct configurations of edges between them. A non-limiting example is a set of networks representing relationships (friendship, following) between a set of people in multiple social network services. By incorporating additional social-proximity information from multi-layer networks, the invention described herein can search for a target in a privacy-preserving manner (i.e., using a privacy guarantee process, such as that described in Literature Reference No. 5) with increased accuracy compared to using information in a single network alone. Compared to Literature Reference No. 5, the system described herein provides a generalized algorithm which can take multiple graphs of a multi-layer network (rather than a single network (as in Literature Reference No. 5)) and incorporate richer information into the discovery of targeted sub-networks. More specifically, the method described in this disclosure identifies targets with high accuracy by leveraging and fusing multiple layers of network information that represent a variety of social proximities among network nodes, which leads to incorporating heterogeneous information (e.g., work-related professional information in LinkedIn®, friend-centered social relation in Facebook®) into the search of targeted sub-network, resulting in the expectedly increased accuracy. Additionally, the unique search method performs the above functions while differentially protecting the privacy of non-targets. Each of these aspects will be described in further detail below.

(3.1) Settings and Foundational Algorithms

The following is a description of an algorithm for differential private insider threat detection in multilayer networks according to embodiments of the present disclosure. First, a brief description and overview of the general setting related to differentially private systems is provided. In a query/response model, it is supposed that there are two entities, a querier (client which wants to compute some function on the information of the networks) and a responder (database holder/server which holds information of multiple networks which the client wants to compute some function on) denoted by C and S, respectively, where S's database is denoted by D (a database holding the information of the multiple networks). Client C may query a function f to server S by sending f to S. Upon the reception of query f, S computes f(D) and returns f(D) as a response to C.

In the setting of the invention, the client and server are not differentiated. This is because the database (e.g., social networks based on public domains, such as Twitter®, Facebook®, etc.) on which the algorithm works is a public and open source. Therefore, there is not a designated server S holding private data. However, even if the algorithm works with public data, one does not wish to violate the privacy of data (e.g., a list of friends for an individual) for every individual due to the Privacy Act (i.e., even if data is public, it causes legal issues if the data is audited for certain government purposes). Instead, the goal is to discover the targeted sub-network without violating the privacy of members that are not part of the targeted sub-network. Thus, the algorithm implicitly takes both roles of client and server accessing to public open source data.

(3.1.1) Notations for Graphs

Figure 4A:
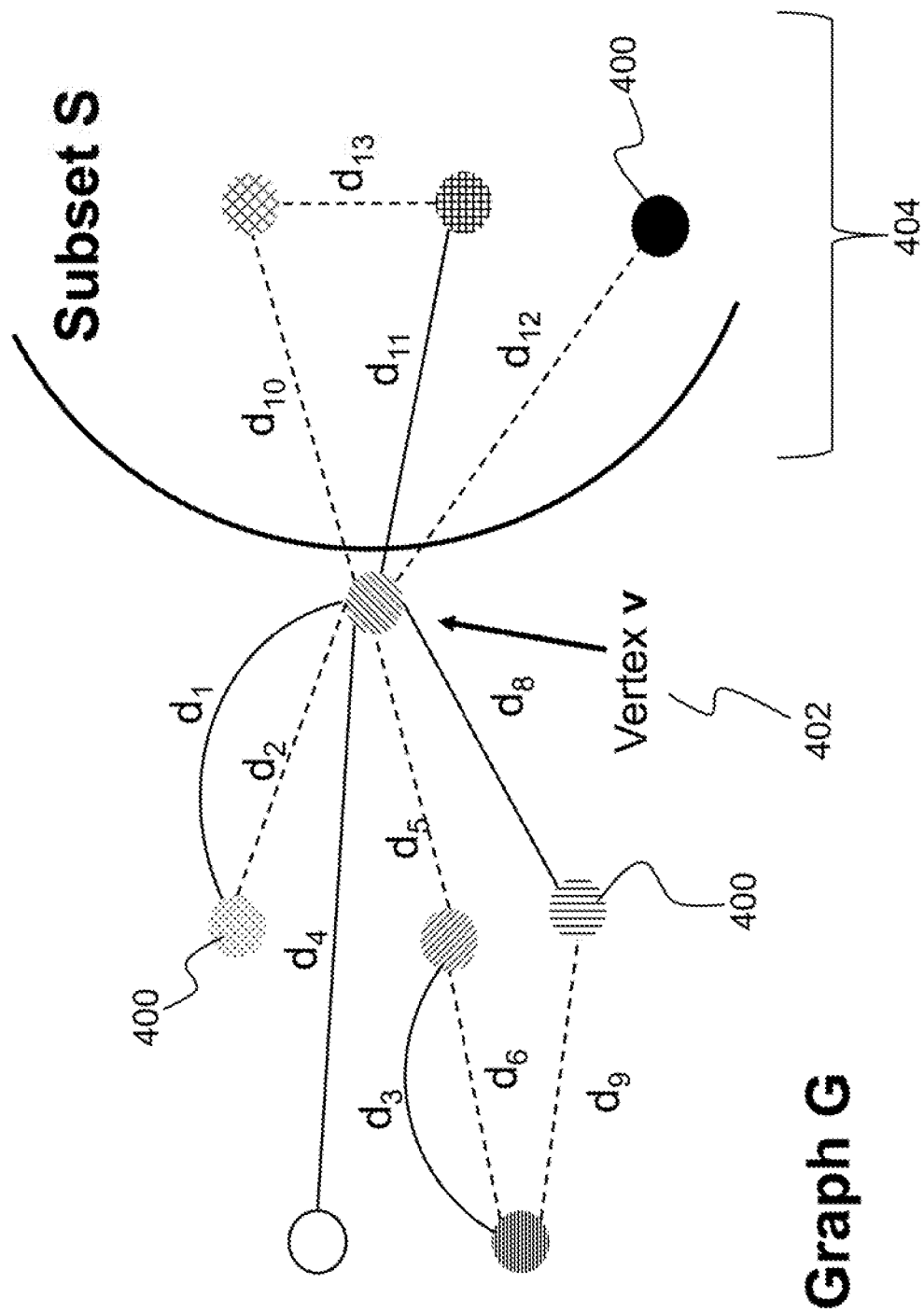
FIG. 4A is an illustration of a weighted unidirected graph G according to some embodiments of the present disclosure.

As depicted in FIG. 4A, a network is viewed as a weighted undirected graph G=(V,E) of nodes (represented by circles (elements 400, for example)), where V is a set of vertices and E is a set of edges, where each edge $e_{ij}$ in E is a tuple of form $(v_i, v_j, w_{ij})$, meaning the existence of an edge of weight $w_{ij}$ between vertices $v_i$ and $v_j$. Here, d represents the weight of edges. The larger the d value between two nodes, the more related the nodes. Naturally, if there is no edge between $v_i$ and $v_j$, then implicitly treat $w_{ij}$=0. For a vertex $v_i$ (e.g., vertex V, element 402), $n(v_i)$ is defined to be a set of all neighbors (n) of $v_i$, where $v_j$ is a neighbor of $v_i$ if $e_{ij}$ is in E. $CN(v_i,v_k)$ is defined to be a common neighbor, which is a set of all vertices $v_j$ such that both $e_{ij}$ and $e_{jk}$ are in E. For notional simplicity, notation $CN(v_i, S)$ is used for some subset $S \subseteq V$ (e.g., subset 404) to denote the set of all common neighbors between $v_i$ and $v_k$ for every $v_k \in S$. That is, $CN(v_i,S) = \cup_{v_k \in S} CN(v_i, v_k)$. A graph $G_\mu=(V, E)$ is said to be a multigraph of multiplicity $\mu$ if each pair of two vertices can have at most $\mu$ edges in E. In the case of multigraph $G_\mu$, for $(v_i, v_j)$, $e_{ij}$ denotes the set of all edges $e^1_{ij}, e^2_{ij}, \ldots, e^m_{ij}$ between $v_i$ and $v_j$ where $m \leq \mu$. Note that if $\mu=1$, then it is simply a graph G.

Figure 4B:
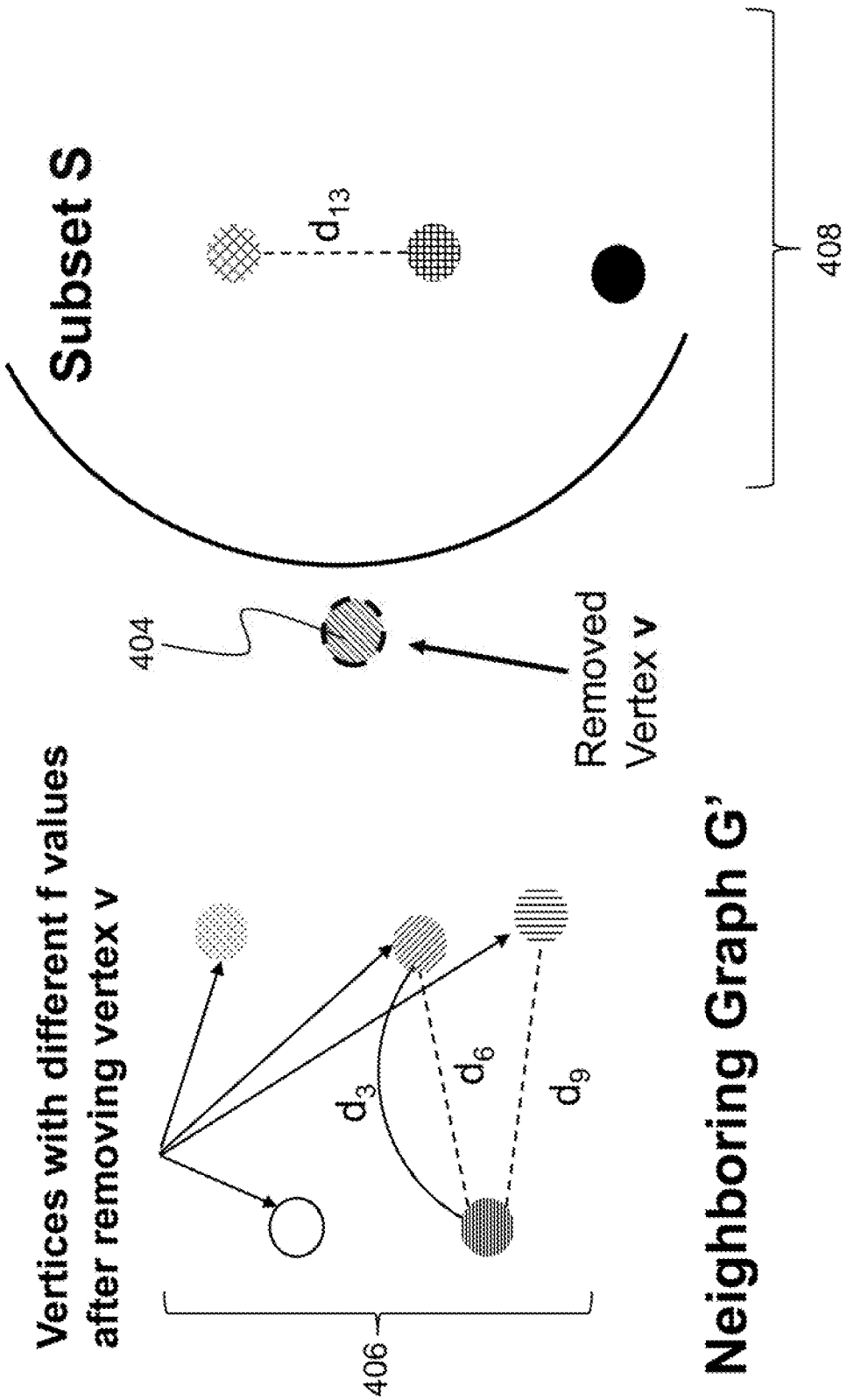
FIG. 4B is an illustration of a neighboring graph G' of the weighted unidirected graph G according to some embodiments of the present disclosure.

Additionally, a notion of neighboring graph of G is used, as illustrated in FIG. 4B. A neighboring graph for G is all graphs G' such that the G' is an identical graph to G except that G' can be obtained by removing a single node from G (i.e., removed vertex V 404). A mathematical definition defines what neighboring graphs G and G'. G is a neighbor to G' if there exists a single node v such that if one removes v from G, then G' is obtained. The result is vertices with different f values after removing vertex v (element 406). The neighbor graph G' with respect to a graph G is denoted by G'~G. Finally, set T denotes a targeted subgraph of G (subset S, element 408), which is essentially the target sub-structure of G desired to be discovered by the algorithms of the present disclosure.

(3.1.2) Proximity of Two Vertices in a Multigraph and Sensitivity of Proximity

A proximity function f(v,S) in a multigraph $G_\mu=(V,E)$ is introduced, where for all edges $e^k_{ij}$, which measures how much closer a vertex v is to a subgroup of vertices, $S \subseteq V$ in the graph. Let G be a set of all graphs with n nodes. Let $G_\mu=(V,E)$ be a graph in G. Suppose that S is a subset of V. For a set V, P(V) is a power set of V (e.g., the set of all possible subsets of V). Let R be a range of function f, where R is the set of real numbers. Then, for a graph $G_\mu=(V,E)$ E G, for $v_i \in V$, a function f: $G \times V \times P(T) \rightarrow R$ is defined to be:

$$f(G,v_i,S) = \Sigma_{v_j \in CN(v_i,S)}(w_{ij}\Sigma_{v_k \in n(v_j) \cap S} w_{jk}).$$

Figure 3:
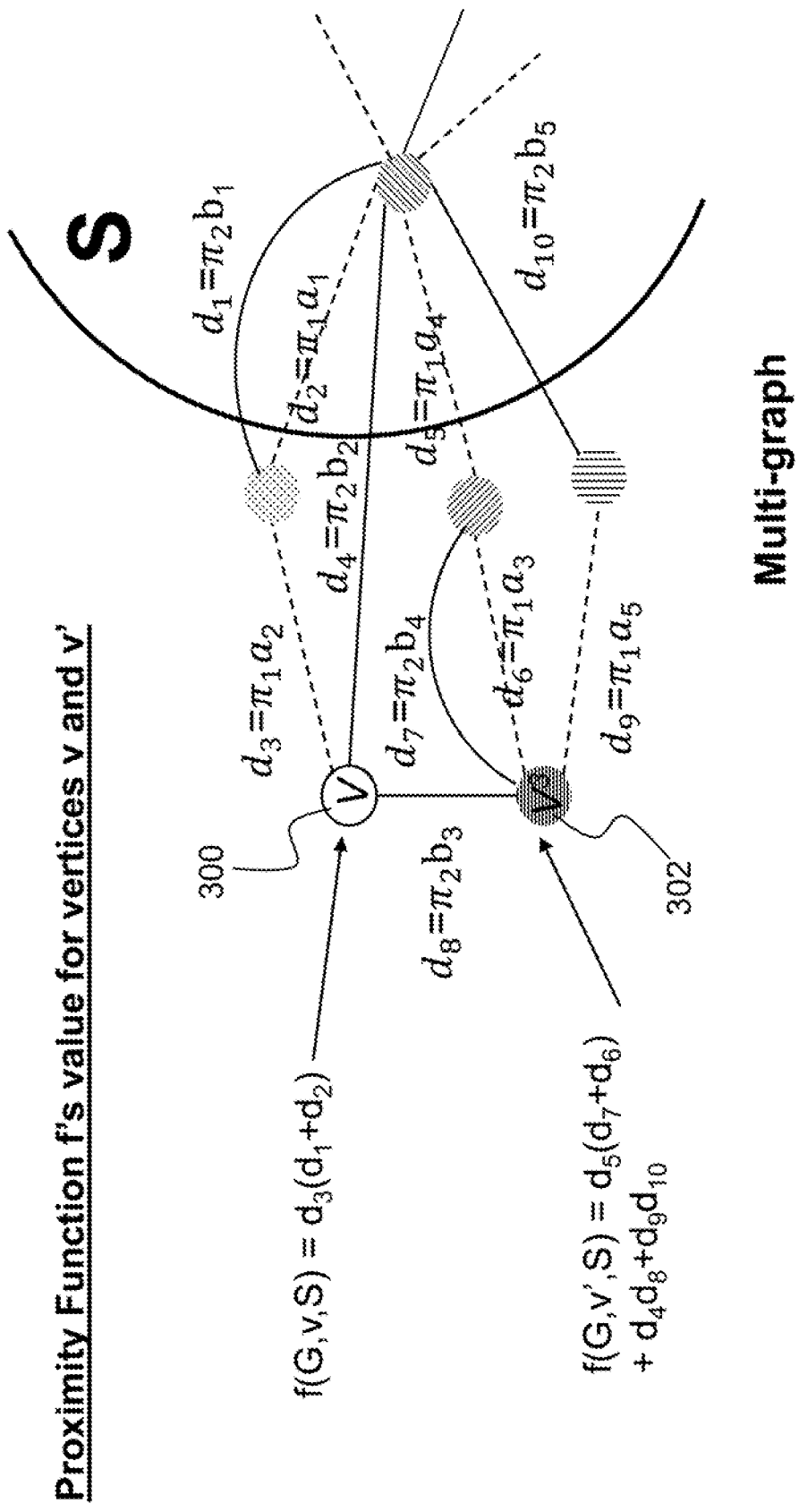
FIG. 3 is an illustration of generalization of a common neighbor function adopted as a proximity function in the setting of single layer network according to some embodiments of the present disclosure.

In other words, $f(v_i,S)$ indicates how $v_i$ is closely related to set S, as the higher the f value is, the closer $v_i$ is to S. Function f is a generalization of a common neighbor function adopted as a proximity function in the setting of a single layer network by Kearns et. al. (see Literature Reference No. 5 for a description of a proximity function in the setting of a single layer network). However, it is applied to a multilayer network in the present invention. FIG. 3 depicts a pictorial example of a proximity function f's value for vertices v (element 300) and v' (element 302). FIG. 3 can be considered a merged version of two graphs M1 and M2 (two-layered networks). Each graph is associated with a contributing factor π. $π_1$ is for M1 and $π_2$ is for M2. The merging process is described in detail below. In FIG. 3, each d is a weight of an edge between two nodes which represents the closeness of the two nodes. F(G, v, S) and f(G, v', S) are proximity values calculated based on the information of merged graphs, which represents how close two nodes are in the multi-graph.

(3.1.3) Impact Cardinality of Function f

The notion of impact cardinality defined in Kearns et. al. (see Literature Reference No. 5) is borrowed, which is another quantity related to proximity function f called Impact cardinality. Let f: $G \times V \times P(V) \rightarrow R$ be a proximity function. Then, the impact cardinality of function f, denoted by IC(f) is $$\max_{G \sim G', S \in T} |\{v \in V : : f(G, v, S) \neq f(G', v, S)\}|.$$

In other words, impact cardinality measures the number of nodes affected by changes of G' and S in terms of values of proximity function f.

(3.2) System and Description

Based on the building block algorithms and settings described in the previous section, the design of the differentially-private insider threat search system in the multilayer graph according to embodiments of the present disclosure is described below. The algorithm is denoted by M, where the algorithm M is a tuple of three algorithms ($M_1$, $M_2$, $M_3$) described as follows. Algorithm $M_1$ is to take multi-layer graphs $\{G^1, G^2, \ldots, G^\mu\}$ and transform them into a single multi-graph $G_\mu$. Algorithm $M_2$ is an algorithm to discover a connected subcomponent S of multi-graph $G_\mu$. Algorithm $M_3$ is an algorithm which discovers a new source vertex v.

(3.2.1) Description of Algorithm $M_1$: Incorporating Multi-Layer Graphs into a Single Layer Multigraph Algorithm M takes as input a multilayer network expressed as a set of μ graphs and outputs a single layer multigraph. In the following, a parameter $π_i$ is defined to measure the relative significance of each network (where significance is assumed to be given by the client). given by graph $G^i$ for $i \in [\mu]$ with the condition that $π = π_1 + π_2 + \ldots + π_\mu$.

Write $\pi_i E_i$ to denote that each weight of all edges in $G^i$ (e.g., $E^i$) is multiplied by $\pi_i$. The formal description of algorithm $M_1$ is given in the following.

Input: Multilayer $\mu$ graphs $G^1, G^2, \ldots, G^\mu$ such that each $G^i=(V^i, E^i)$ shares an identical set of vertices with distinct edge sets. That is, $V^i=V^j$ for all i and j. For all i, the maximum weight of edge is upper-bounded by some constant $w_{max}$.

Output: a multigraph $G_\mu=(V, E)$ where $w_{max}$ is the upper-bound on weight of edges.

Step 1. Set $V=V^1$.
Step 2. Set $E=\cup_{k\in[\mu]}\pi_k E^k$
Here, $\cup$ is a union of sets, $\pi$ is a parameter defined above representing relative significance between multiple graphs, and k is an index for each graph.

Figure 5:
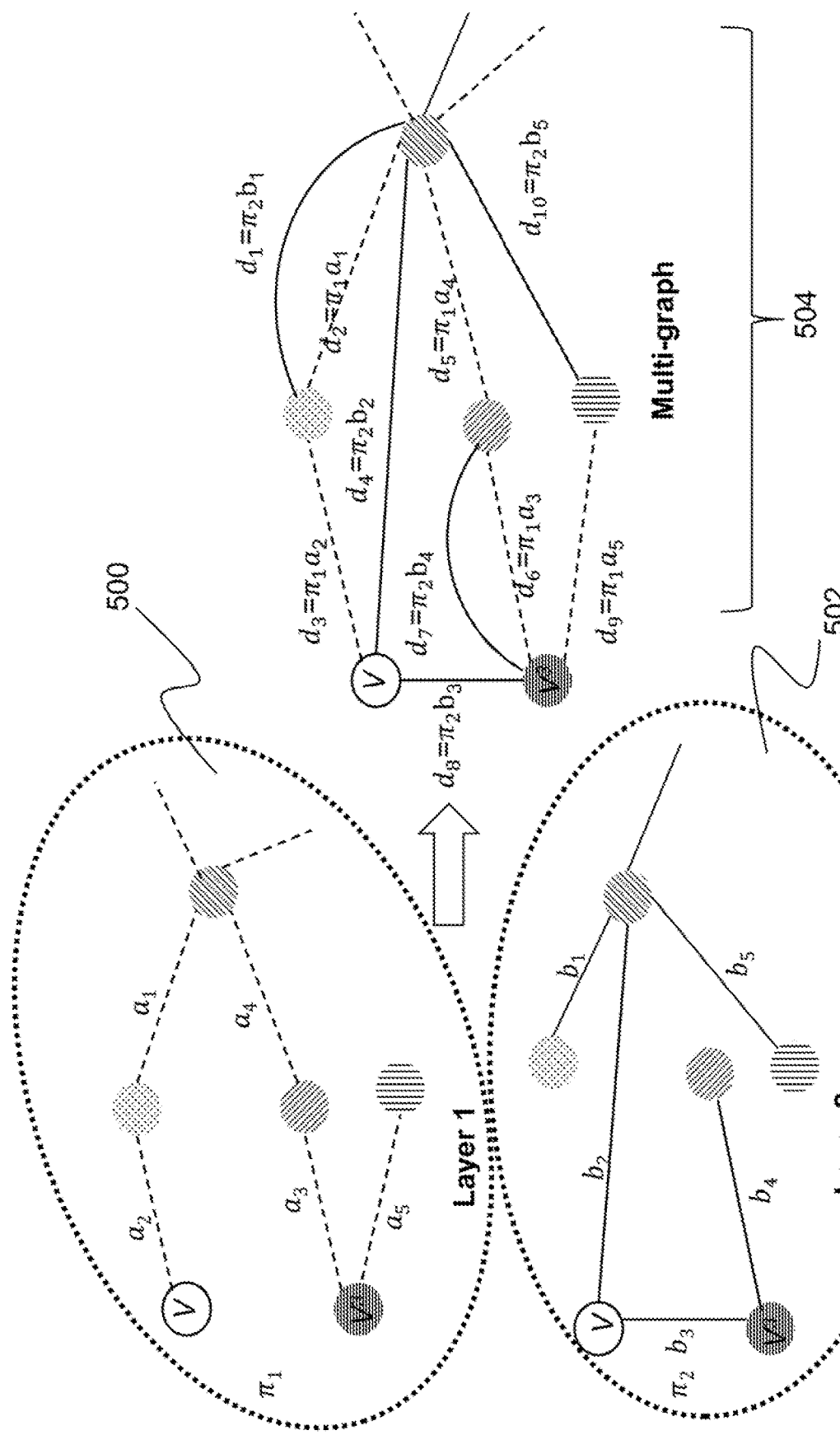
FIG. 5 is an illustration of algorithm $M_1$ that takes a two-layer graph and outputs a single multi-graph according to some embodiments of the present disclosure.

FIG. 5 illustrates a pictorial example of algorithm $M_1$ that takes a multi-layer graph (e.g., layer 1 (element 500), layer 2 (element 502)) and outputs a single multigraph (element 504). In FIG. 5, the variables a and b are values representing the closeness between two nodes in the graphs. The variable a represents the closeness in layer 1, and the variable b represents the closeness in layer 2.

(3.2.2) Description of Algorithm $M_2$: Statistic-First Search on Multigraphs

The $M_2$ algorithm finds a connected subcomponent containing input source vertex s in G. A connected subcomponent of a graph G is a graph consisting of a subset of nodes and edges in G where all nodes have a path (a series of edges) to each other. In the following, a function $I:V\to\{0, 1\}$, defined as follows is used:

$$I(v) = \begin{cases} 1 & \text{if } v \in T \\ 0 & \text{Otherwise} \end{cases}.$$

The function I(v) models an in-depth investigation on the individual corresponding to the vertex v. It is a function that models real-world investigation or interrogation (e.g., FBI investigation on an individual). Each node in the network represents an individual. For example, Facebook friendship can be represented by a large graph where each node is a person and an edge between two people represents the friend relation. If I(v)=1, then it means the individual v is a part of targeted group. Additionally, an auxiliary function $W: V\times P(T)\to V$ defined as follows is used:

$$W(v_i, T) = \Sigma_{v_j\in T\cap n(v_i)}(\Sigma_{\forall k \text{ such that } e_{ij}^k \in E} w_{ij}^k),$$

which is a sum of all weights of edges between $v_i$ and all nodes in T, if any. Superscripts denote an index of a graph. The formal description of algorithm $M_2$ is provided below.

(3.2.2.1) Description of $M_2$ ($G_\mu$, t): Finding Connected Components Containing Target $t\in T$
Input: Target $t\in T$ and multigraph $G_\mu$
Step 1. Initialization
  a. Set T'={t}, Inv={t}, N=n(T'), where Inv denotes a set name.
Step 2. While N\Inv≠∅, do the following, where ∅ denotes an empty set:

$$v' = \underset{v_i\in N\backslash Inv}{\operatorname{argmax}} W(v_i, T')$$

b. Query l(V) and add v' to set Inv.
  c. If l(v')=1, then add v' to T' and N=n(T').

Step 3. Once the above "while loop" halts, output T'.

(3.2.3) Description of $M_3$: Searching for a New Target

Algorithm $M_3$ takes as inputs multigraph $G_\mu$, T', Inv, $\partial$, and ß. T' is the set of targeted members, which is the result of algorithm $M_2$. Set Inv is also the set of vertices investigated during the execution of $M_2$. Parameter $\partial$ is a randomly perturbed threshold on the number of queries to investigation oracle I, where $\partial$ is a predefined constant. Parameter ß is a desired privacy requirement that is negligible in the security parameter.

The $M_3$ algorithm is similar to the SearchCom algorithm by Kearns et. al. (see Literature Reference No. 5) except that a unique proximity function f is used. Similar to Literature Reference No. 5 (following the general framework to achieve differential privacy (see Literature Reference Nos. 1-4)), the Laplacian perturbation technique is also employed. Differential privacy is defined as a measure that captures the increased risk to one's privacy incurred by participating in a database (see Literature Reference No. 6).

The Laplacian distribution centered at 0 is denoted by Lap(b) with probability density function:

$$\frac{1}{2b}\exp\left(-\frac{|x|}{b}\right).$$

Also considered is the targeted sensitivity of the proximity function f. The targeted sensitivity of f measures the largest difference between f(G, t, S) and f(G', t, S) for all neighboring graphs G and G'. Its formal expression is as follows:

$$\Delta(f) = \max_{G\sim G', t\in T, S\subseteq T} |f(G, t, S) - f(G', t, S)|.$$

Note that the targeted sensitivity in the setting of the multi-layer network according to embodiments of the present disclosure is $(w_{max})^2$ while in Kearns et. al. (see Literature Reference No. 5), their targeted sensitivity is 1. Indeed, if $w_{max}=1$, then the targeted sensitivity of f in the invention described herein is 1 as well. Finally, the formal description of algorithm $M_3$ is provided below.

(3.2.3.1) Description of $M_3$ ($G_\mu$, T', Inv, f, $\partial$, ß): Finding a new target $t\in T$.
Input: $G_\mu$ is a multigraph, T' is a subset of T, Inv is a subset of V, f is a proximity function, $\partial$ is a constant, and B is the desired privacy level.
Step 1. Initialization
  a. Set $\partial'=\partial+r$ where r is sampled based on Lap(2IC(f)/ß).
  b. Set cnt=1
Step 2. For each v∈V\Inv, Do
  a. Compute f' (t, T')=f(t, t)+r, where r is a fresh random value according to the distribution Lap(4 $w_{max}$/ß)
  b. Sort all vertices in the descending order with respect to f' values.
Step 3. While V\Inv≠∅, and cnt≤$\partial'$, do
  a. Set $v_{cur}$=vertex ranked at cnt
  b. Query l($v_{cur}$)=1 and add $v_{cur}$ to Inv.
  c. If l($v_{cur}$)=1, then halt and return $v_{cur}$
  d. Otherwise, cnt=cnt+1
Step 4. Return ø

(3.2.4) Description of the Query System
The query system in this disclosure is a generalized version of the one disclosed in Literature Reference No. 5. The main difference in the system disclosed herein is that the subroutines described above are used, which are properly modified to work with multi-layer networks. The formal description of the query system described herein is as follows.

Input: A multi-layer network ($G^1$, $G^2$, ..., $G^\mu$), a seed vertex t, proximity function f, query threshold $\partial$, component threshold c, and privacy parameter ß.
Step 1. Initialization
   a. Set Inv={t}.
Step 2. Compute $G_\mu = M_1(G^1, G^2, \ldots, G^\mu)$.
Step 3. Compute $T' = M_2 (G_\mu, t)$.
Step 4. For $1 \le i \le c$, do the following:
   a. Set $t' = M_3 (G_\mu, T', Inv, f, ß, \partial)$.
   b. If $t' = \emptyset$, then halt and return T'.
   c. Otherwise, compute $T' = T' \cup M_2(G_\mu, t')$.
Step 5: Output T'

The system and method according to embodiments of the present disclosure identifies insider threats in a privacy-preserving manner by exploring social/network proximity. Given a small set of bad actors (known insiders), the system uses noise injected methods to identify potential insider threats in a privacy-preserving sense. Noise injection methods are described herein as drawing random values from Laplacian distribution.

The invention described herein is applicable to any company or organization that could use a system to identify and detect insiders before they disseminate sensitive internal data to a malicious (external) party. In particular, the system according to embodiments of the present disclosure assists in accurately identifying malicious insiders from rich information from multi-layer networks, such as email history, data from social media, and other open-source data streams, including hidden services for illegal data transactions. The method finds a hidden network of individuals in an organization (represented by a network) which show closeness to external competitors or known malicious entities outside the organization. A number of actions can be taken if such individuals are identified. As a non-limiting, the system can terminate all credentials to those individuals and/or block access to certain sites, computers, or servers within the network.

At the same time, the system can guarantee that the privacy of benign employees (i.e., non-insiders) in the organization are protected. The system uses the PAC (probably approximately correct) learner concept. That is, the privacy guarantee is rooted in the fact that the probability of an incorrect identification of an insider threat is so small that it is mathematically provable that the incorrect identification is not possible, given the tolerance threshold.

If a potential insider threat (node in the targeted sub-network) is identified, an alert is generated to notify law enforcement department/organization/company. The alert may be a visual alert, such as a textual message or a graphic displayed on a monitor of one or more users at a law enforcement department/organization/company. Following the alert, the law enforcement/organization/company can investigate and monitor behaviors/digital traces of those threats. For instance, law enforcement can interview persons who might pose a threat to confront and isolate the risks, if they have not yet carried out their espionage. If they did, then the method described herein provides a starting point for forensic analysis (i.e., evidence-based case building against the bad actors).

Another non-limiting example of an application of the invention is searching for candidate terrorists or criminals. The method enables law enforcement organizations to identify terrorists or criminals by investigating multi-layer network information, such as a combination of terrorist/criminal networks, phone traces, and open-source hidden services for terrorist/criminal activities, while differentially preserving the privacy of benign citizens.

Figure 6:
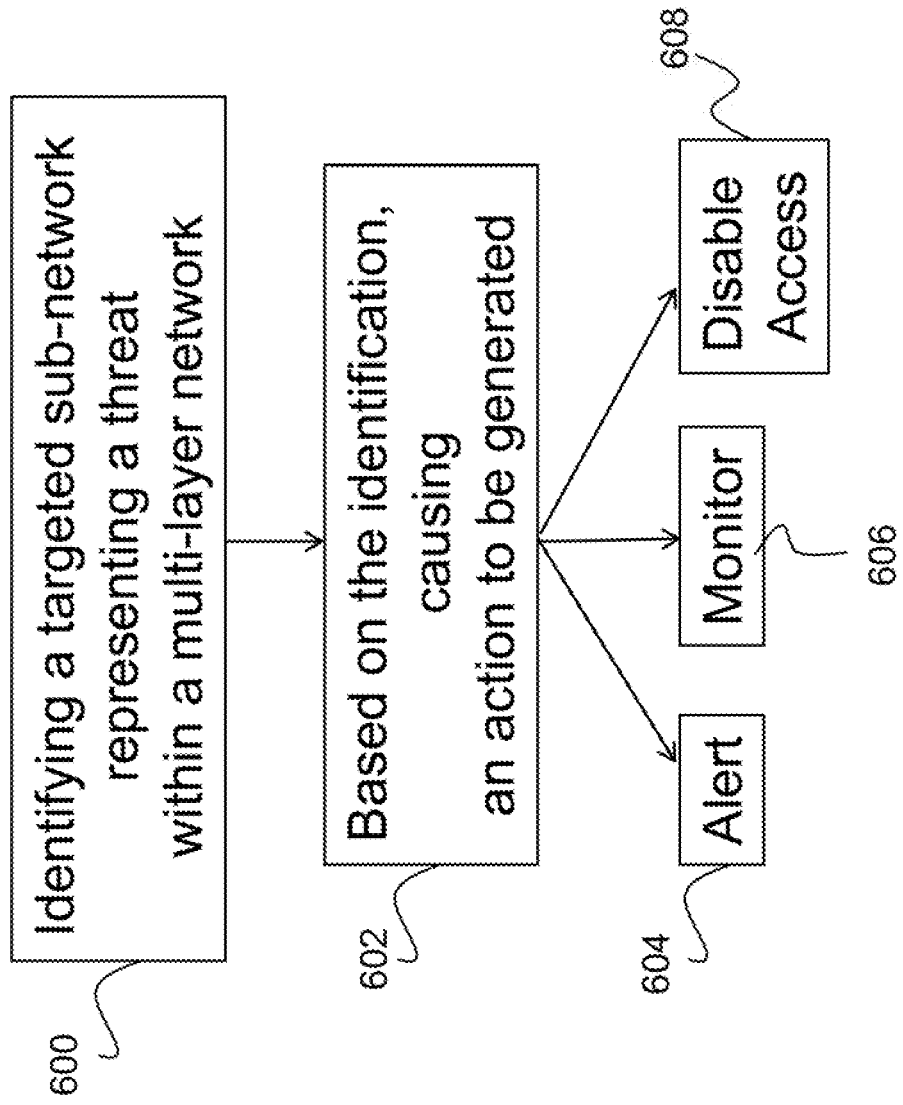
FIG. 6 is a flow diagram illustrating privacy-preserving targeted substructure discovery on networks according to embodiments of the present disclosure.

FIG. 6 is a flow diagram illustrating privacy-preserving targeted substructure discovery on networks according to embodiments of the present disclosure. The system identifies a targeted sub-network representing a threat within a multi-layer network comprising a plurality of non-benign persons (element 600). A benign person is a person that poses no serious threat and is not harmful. Thus, a non-benign person is one that poses a threat and is potentially harmful. Following identification of the targeted sub-network representing a threat (element 600), the system causes an action to be generated (element 602).

Non-limiting examples of actions that can be performed by the system described herein include generating an alert of a threat (element 604), initiating monitoring of the non-benign persons (element 606), and disabling network access of the non-benign persons (element 608). An alert of a threat can be generated and transmitted as described above, which may include issuing an alert to a security team for mitigation or incident response Initiating monitoring of non-benign persons may include initiating analyzing and evaluating of data (emails, text messages, internet browsing history, social media posts) originating from the non-benign persons. Example of disabling network access include preventing the non-benign persons from being able to connect to an Internet network or sign on to a social media network platform.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for network threat detection, the system comprising:
   one or more processors and a non-transitory computer-readable medium having executable instructions encoded thereon such that when executed, the one or more processors perform operations of:
      merging a plurality of layers of a multi-layer network into a single layer multigraph,
      wherein each layer comprises a plurality of vertices and a plurality of edges, wherein each vertex represents an individual and each edge represents a social relation between individuals,
      wherein each layer comprises at least one identical set of vertices with distinct configurations of edge sets from each other layer, wherein the distinct configurations of edge sets represent distinct social proximities between the same individuals among the plurality of layers of the multi-layer networks;
      following merging of the plurality of layers into the single layer multigraph, determining a weight value for each edge between each pair of vertices, wherein each weight value correlates to a closeness of the individuals in a respective layer of the multi-layer network;

using the weight values, determining social proximity information for the same individuals in distinct layers of the multi-layer network;

given a seed vertex corresponding to a known malicious entity and the social proximity information, identifying a targeted sub-network in the single-layer multigraph, wherein the targeted sub-network is a connected subcomponent containing the seed vertex in the single layer multigraph, wherein the targeted sub-network comprises targeted individuals corresponding to vertices within the targeted sub-network;

wherein the targeted sub-network in the single-layer multigraph is identified with differential privacy protection, such that privacy of individuals that are not in the targeted sub-network is protected; and based on identification of the targeted sub-network, causing an action to be generated, wherein the action comprises one of generating an alert of a threat, initiating monitoring of the targeted individuals, or disabling network access of the targeted individuals.

2. The system as set forth in claim 1, wherein identifying the targeted sub-network comprises discovering a new source vertex in the single layer multigraph.

3. The system as set forth in claim 2, wherein the one or more processors further performs operations of:

investigating a set of vertices to determine if an individual corresponding to a vertex is in the targeted sub-network; and outputting a set of individuals of the targeted sub-network.

4. The system as set forth in claim 3, wherein the one or more processors performs an operation of determining a proximity function $f$ which measures the largest difference between $f(G, t, S)$ and $f(G', t, S)$ for all neighboring graphs G and G' according to the following:

$$\Delta(f) = \max_{G-G', t \in T, S \subseteq T} |f(G,t,S) - f(G',t,S)|,$$

where G' is a neighboring graph with respect to graph G, t represents a targeted individual, T represents a targeted subgraph of G, and max represents a maximization function.

5. A computer program product for network threat detection, the computer program product comprising:

a non-transitory computer-readable medium having executable instructions encoded thereon, such that upon execution of the instructions by one or more processors, the one or more processors perform operations of:

merging a plurality of layers of a multi-layer network into a single layer multigraph, wherein each layer comprises a plurality of vertices and a plurality of edges, wherein each vertex represents an individual and each edge represents a social relation between individuals, wherein each layer comprises at least one identical set of vertices with distinct configurations of edge sets from each other layer, wherein the distinct configurations of edge sets represent distinct social proximities between the same individuals among the plurality of layers of the multi-layer networks;

following merging of the plurality of layers into the single layer multigraph, determining a weight value for each edge between each pair of vertices, wherein each weight value correlates to a closeness of the individuals in a respective layer of the multi-layer network;

using the weight values, determining social proximity information for the same individuals in distinct layers of the multi-layer network;

given a seed vertex corresponding to a known malicious entity and the social proximity information, identifying a targeted sub-network in the single-layer multigraph, wherein the targeted sub-network is a connected subcomponent containing the seed vertex in the single layer multigraph, wherein the targeted sub-network comprises targeted individuals corresponding to vertices within the targeted sub-network;

wherein the targeted sub-network in the single-layer multigraph is identified with differential privacy protection, such that privacy of individuals that are not in the targeted sub-network is protected; and based on identification of the targeted sub-network, causing an action to be generated, wherein the action comprises one of generating an alert of a threat, initiating monitoring of the targeted individuals, or disabling network access of the targeted individuals.

6. The computer program product as set forth in claim 5, wherein identifying the targeted sub-network comprises discovering a new source vertex in the single layer multigraph.

7. The computer program product as set forth in claim 6, further comprising instructions for causing the one or more processors to perform operations of:

investigating a set of vertices to determine if an individual corresponding to a vertex is in the targeted sub-network; and outputting a set of individuals of the targeted sub-network.

8. The computer program product as set forth in claim 7, further comprising instructions for causing the one or more processors to perform an operation of:

determining a proximity function $f$ which measures the largest difference between $f(G, t, S)$ and $f(G', t, S)$ for all neighboring graphs G and G' according to the following:

$$\Delta(f) = \max_{G-G', t \in T, S \subseteq T} |f(G,t,S) - f(G',t,S)|,$$

where G' is a neighboring graph with respect to graph G, t represents a targeted individual, T represents a targeted subgraph of G, and max represents a maximization function.

9. A computer implemented method for network threat detection, the method comprising an act of:

causing one or more processors to execute instructions encoded on a non-transitory computer-readable medium, such that upon execution, the one or more processors perform operations of:

merging a plurality of layers of a multi-layer network into a single layer multigraph, wherein each layer comprises a plurality of vertices and a plurality of edges, wherein each vertex represents an individual and each edge represents a social relation between individuals, wherein each layer comprises at least one identical set of vertices with distinct configurations of edge sets from each other layer, wherein the distinct configurations of edge sets represent distinct social proximities between the same individuals among the plurality of layers of the multi-layer networks;

following merging of the plurality of layers into the single layer multigraph, determining a weight value for each edge between each pair of vertices, wherein each weight value correlates to a closeness of the individuals in a respective layer of the multi-layer network;

using the weight values, determining social proximity information for the same individuals in distinct layers of the multi-layer network;

given a seed vertex corresponding to a known malicious entity and the social proximity information, identifying a targeted sub-network in the single-layer multigraph, wherein the targeted sub-network is a connected sub-component containing the seed vertex in the single layer multigraph, wherein the targeted sub-network comprises targeted individuals corresponding to vertices within the targeted sub-network;

wherein the targeted sub-network in the single-layer multigraph is identified with differential privacy protection, such that privacy of individuals that are not in the targeted sub-network is protected; and based on identification of the targeted sub-network, causing an action to be generated, wherein the action comprises one of generating an alert of a threat, initiating monitoring of the targeted individuals, or disabling network access of the targeted individuals.

10. The method as set forth in claim 9, wherein identifying the targeted sub-network comprises discovering a new source vertex in the single layer multigraph.

11. The method as set forth in claim 10, wherein the one or more processors further performs operations of:

investigating a set of vertices to determine if an individual corresponding to a vertex is in the targeted sub-network; and outputting a set of individuals of the targeted sub-network.

12. The method as set forth in claim 11, wherein the one or more processors performs an operation of determining a proximity function $f$ which measures the largest difference between $f(G, t, S)$ and $f(G', t, S)$ for all neighboring graphs G and G' according to the following:

$$\Delta(f) = \max_{G \sim G', t \in T, S \subseteq T} |f(G,t,S) - f(G',t,S)|,$$

where G' is a neighboring graph with respect to graph G, t represents a targeted individual, T represents a targeted subgraph of G, and max represents a maximization function.

* * * * *